US012115532B2

(12) United States Patent
Kinney et al.

(10) Patent No.: US 12,115,532 B2
(45) Date of Patent: Oct. 15, 2024

(54) CARTRIDGE, ELECTROWETTING SAMPLE PROCESSING SYSTEM AND BEAD MANIPULATION METHOD

(71) Applicant: TECAN TRADING AG, Mannedorf (CH)

(72) Inventors: Patrick Kinney, Hayward, CA (US); Sujata Iyer, San Jose, CA (US); Tin Ngo, San Jose, CA (US); Jennifer Ji, Fremont, CA (US); Marta Matvienko, Davis, CA (US); Tiffany Ding (Lay), San Jose, CA (US)

(73) Assignee: TECAN TRADING AG, Mannedorf (CH)

( * ) Notice: Subject to any disclaimer, the term of this patent is extended or adjusted under 35 U.S.C. 154(b) by 0 days.

(21) Appl. No.: 18/138,911

(22) Filed: Apr. 25, 2023

(65) Prior Publication Data

US 2023/0256444 A1 Aug. 17, 2023

Related U.S. Application Data

(62) Division of application No. 15/975,283, filed on May 9, 2018, now Pat. No. 11,666,914.

(51) Int. Cl.
*B01L 3/00* (2006.01)

(52) U.S. Cl.
CPC ... *B01L 3/502761* (2013.01); *B01L 3/502792* (2013.01); *B01L 2300/123* (2013.01); *B01L 2400/0427* (2013.01)

(58) Field of Classification Search
CPC ......... B01L 3/502761; B01L 3/502792; B01L 2300/123; B01L 2400/0427
See application file for complete search history.

(56) References Cited

U.S. PATENT DOCUMENTS

| | | | | |
|---|---|---|---|---|
| 11,666,914 | B2 * | 6/2023 | Kinney ............. | B01L 3/502715 435/173.9 |
| 2010/0143963 | A1 | 6/2010 | Pollack et al. | |
| 2011/0091989 | A1 | 4/2011 | Sista et al. | |
| 2011/0104747 | A1 | 5/2011 | Pollack et al. | |
| 2013/0134040 | A1 | 5/2013 | Lee et al. | |

(Continued)

FOREIGN PATENT DOCUMENTS

WO 2017040818 A1 3/2017

*Primary Examiner* — Brian J. Sines
(74) *Attorney, Agent, or Firm* — Notaro, Michalos & Zaccaria P.C.

(57) ABSTRACT

A cartridge, in particular a disposable cartridge, for use in an electrowetting sample processing system. The cartridge contains an internal gap with at least one hydrophobic surface for enabling an electrowetting induced movement of a microfluidic droplet that has magnetic beads and further has a bead accumulation zone, into which the microfluidic droplet is transferable by electrowetting force and the magnetic beads are exposable to a magnetic force of a bead manipulation magnet. The internal gap has a bead extraction opening adjacent to the bead accumulation zone. The bead extraction opening provides a passage from the gap to an exterior space of the cartridge and is configured to removably receive the bead manipulation magnet for enabling an extraction of the magnetic beads from the microfluidic droplet by a removal of the bead manipulation magnet.

22 Claims, 4 Drawing Sheets

(56) References Cited

U.S. PATENT DOCUMENTS

| | | | |
|---|---|---|---|
| 2015/0196907 | A1 | 7/2015 | Beebe et al. |
| 2015/0314293 | A1 | 11/2015 | Sista et al. |
| 2017/0072397 | A1 | 3/2017 | Campbell et al. |
| 2019/0331638 | A1 | 10/2019 | Kinney et al. |

* cited by examiner

CARTRIDGE, ELECTROWETTING SAMPLE PROCESSING SYSTEM AND BEAD MANIPULATION METHOD

RELATED APPLICATION

This application is a divisional application of U.S. patent application Ser. No. 15/975,283 filed May 9, 2018 which is herein incorporated by reference in its entirety.

TECHNICAL FIELD OF THE INVENTION

The current invention relates to a cartridge, in particular a disposable cartridge, for use in an electrowetting sample processing system, an electrowetting sample processing system and a method for operating such a cartridge or system.

Traditionally, electrowetting based cartridges and systems are used to perform analytical processes. Samples to be analyzed, reagents and diluents are introduced in a cassette filled with an electrowetting filler liquid. The analytical processes are performed by using electrowetting forces for moving, mixing or diluting droplets within the cassette. The assay result may be indicated by change or intensity of color or alternatively by arising or change of intensity of fluorescence. It can be measured by light absorbance or fluorescence measurement. After the read-out, the cassette is discarded with its content or the content is sucked out of the cassette by applying vacuum and the emptied cassette is discarded and the content is disposed.

In contrast to analysis, the products of chemical or biochemical reactions may be used for further downstream processes. Products may be amplified nucleic acids, antibody-antigen complexes or other protein complexes. Downstream processes may be gene sequencing or protein characterization.

DESCRIPTION OF THE RELATED ART

The aqueous droplets containing the products may be moved to an inlet/outlet port by electrowetting forces. The droplet may by pipetted off the cartridge through the inlet/outlet port. It is frequently a problem that electrowetting filler liquid will be pipetted along with the aqueous droplet, requiring additional steps to separate the electrowetting filler liquid. Another problem is that the droplet can fracture when it is pipetted out of the gap, resulting in loss of some of the aqueous phase.

Known embodiments of bead manipulation cartridges are disclosed for example in WO 2017/040818 A1, describing a cartridge with an internal barrier element for attracting and removing magnetic beads from a liquid droplet.

SUMMARY OF THE INVENTION

It is the aim of the invention to provide a cartridge and a system for removing products from an electrowetting cartridge for further downstream processes.

It is a task of the current invention to provide a cartridge, electrowetting sample processing system and a method that allows improved manipulation of microfluidic droplets and/or magnetic beads.

This task is solved by a cartridge with the features of claim 1. Further embodiments of the cartridge, an electrowetting sample processing system with or without such a cartridge, as well as a method for operating such a cartridge or system are defined by the features of further claims.

The invention concerns a cartridge, in particular a disposable cartridge, for use in an electrowetting sample processing system, wherein the cartridge comprises an internal gap with at least one hydrophobic surface for enabling an electrowetting induced movement of a microfluidic droplet that comprises magnetic beads and further comprises a bead accumulation zone, into which the microfluidic droplet is transferable by electrowetting force and in which the magnetic beads are exposable to a magnetic force of a bead manipulation magnet. The internal gap comprises a bead extraction opening adjacent to the bead accumulation zone, wherein the bead extraction opening provides a passage from the gap to an exterior space of the cartridge and is configured to removably receive the bead manipulation magnet for enabling an extraction of the magnetic beads from the microfluidic droplet by a removal of the bead manipulation magnet. This enables an efficient and reliable bead extraction out of an electrowetting transportation process. In addition, such a cartridge enables the removal of products from the cartridge for further downstream processing.

The invention is particularly advantageous in combination with further downstream processes, which use the products of chemical and/or biochemical reaction performed within the cartridge. In contrast to a conventional electrowetting based cartridge for analytical processes, which is discarded with its content after the read-out of the information of interest, the bead removal according to the invention allows for further external processing of the products obtained or provided within the cartridge.

In the context of the invention the term “processing” may or may not include activities such as transportation or depositing.

In a further embodiment, the cartridge comprises a first part with the bead extraction opening and a second part attached to the first part, such that the gap is formed between the first part and the second part.

In a further embodiment the first part comprises a rigid body and/or the second part comprises or is an electrode support element or a flexible film, in particular a polymer film and/or an electrically isolating film, wherein in particular the film is attached to a peripheral side structure of the first part.

In a further embodiment the gap is defined by a spacer that is arranged between the first part and the second part and/or by the shape of at least one of the two parts of the cartridge, in particular by a flexible part or a rigid part of the cartridge.

In a further embodiment the bead extraction opening is located on a side of the gap opposite to the hydrophobic surface and/or on a peripheral side of the gap. In one example, the bead extraction opening comprises a channel that is arranged perpendicular to the orientation of the gap. Alternatively, the channel is oriented at an angle of less than 90° to the orientation of the gap. For example, the inlet channel can also be oriented parallel to the orientation of the gap and or provide a bead extraction opening trough a peripheral side structure of the cartridge or through a spacer.

In a further embodiment the bead extraction opening is configured to receive a removable sleeve together with the bead manipulation magnet, which in particular is removably insertable into an interior space of the sleeve.

In a further embodiment the cartridge comprises at least one electrode, in particular an electrode array, for applying an electrowetting force to the microfluidic droplet.

In a further embodiment the cartridge comprises at least one processing zone, from which the microfluidic droplet is movable to the bead accumulation zone. In an example, the processing zone is configured for processing at least one of:

a chemical reaction,
a washing process,
a heating process,
a mixing process,
a dilution, and
a hybridization.

In a further example, the processing zone is configured for processing a PCR (Polymerase chain reaction) process and/or a hybridization.

In a further embodiment the cartridge comprises an input port with a sealing surface for receiving a liquid feeding tube, wherein in particular the input port is funnel-shaped with an enlarged opening towards the liquid feeding tube to be received.

In a further embodiment the microfluidic droplet comprises a processing liquid, in particular at least one of: a reagent liquid, a buffer, a diluent, an extraction liquid, a washing liquid and a suspension, which further in particular comprises a suspension single cells and/or cell aggregates.

In a further embodiment the cartridge is configured to be operated with an electrowetting liquid, in particular a filler liquid, further in particular a silicone oil.

In a further embodiment the magnetic beads are loaded with one or more products, in particular products of chemical and/or biochemical reactions, further in particular at least one amplified nucleic acid.

The features of the above-mentioned embodiments of the cartridge can be used in any combination, unless they contradict each other.

Further, the invention concerns an electrowetting sample processing system, in particular a biological sample processing system, comprising a cartridge according to anyone of the above-mentioned embodiments.

The invention further concerns an electrowetting sample processing system comprising an internal gap with at least one hydrophobic surface for enabling an electrowetting induced movement of a microfluidic droplet that comprises magnetic beads and further comprising a bead manipulation magnet and a bead accumulation zone, into which the microfluidic droplet is transferable by electrowetting force and in which the magnetic beads are controllable by a magnetic force of the bead manipulation magnet. The internal gap comprises a bead extraction opening adjacent to the bead accumulation zone, wherein the bead extraction opening provides a passage from an interior space of the gap to an exterior space of the gap and is configured to removably receive the bead manipulation magnet for enabling an extraction of the magnetic beads from the microfluidic droplet by a removal of the bead manipulation magnet.

In an embodiment, the electrowetting sample processing system is configured to receive a cartridge that is disposable and/or reversibly attachable to electrodes of the electrowetting sample processing system, wherein in particular the cartridge comprises a flexible second part, further in particular a flexible film or a membrane.

In a further embodiment the bead extraction opening is configured to receive the bead manipulation magnet together with a removable sleeve, which in particular covers an operating end of the bead manipulation magnet.

In a further embodiment the bead manipulation magnet is configured to be insertable into a hollow inner space of the sleeve.

In a further embodiment the electrowetting sample processing system comprises an array of bead extraction openings, bead manipulation magnets and/or an array of sleeves, in particular a two-dimensional array.

Preferably, the arrays of bead extraction openings, of bead manipulation magnets and/or of sleeves are congruent. It is further preferred that the arrays are orthogonal and the pitch of the elements of the arrays is 9 mm, 4.5 mm or 2.25 mm or the pitch of the elements of the arrays is a multiple of 9 mm, 4.5 mm or 2.25 mm, corresponding to the pitch of the wells of a 96 well, 384 well or 1536 well microplate.

In a further embodiment the electrowetting sample processing system comprises at least one electrode, in particular an electrode array, for applying an electrowetting force to the microfluidic droplet. For example, a plurality of electrodes can be arranged in a first lateral direction and in a second lateral direction, perpendicular to the first lateral direction. The size of an electrode can be in the range of approximately 1.5×1.5 mm.

In an embodiment, the at least one electrode comprises a transport electrode for transporting the microfluidic droplet into and/or away from the bead accumulation zone. Thus, by activating adjacent electrodes and deactivating electrodes on the opposite side of the microfluidic droplet, the microfluidic droplet can be moved in any direction within the gap.

In an embodiment, the electrowetting sample processing system comprises a controller and/or an electrical interface for providing electrical control signals to the at least one electrode.

In a further embodiment the electrowetting sample processing system comprises a transfer opening for transporting beads from the bead extraction opening (60) to an exterior space of the electrowetting sample processing system.

The features of the above-mentioned embodiments of the electrowetting sample processing system can be used in any combination, unless they contradict each other.

Further, the invention concerns a method for operating the cartridge according to anyone of the above-mentioned embodiments or the sample processing system according to anyone of the above-mentioned embodiments of the sample processing system.

The invention further concerns a method for operating a cartridge or a sample processing system, the cartridge or a sample processing system comprising an internal gap with a bead extraction opening, a bead accumulation zone adjacent to the bead extraction opening and at least one hydrophobic surface for enabling an electrowetting induced movement of a microfluidic droplet, wherein the method comprises:

inserting a bead manipulation magnet into the bead extraction opening;

providing a microfluidic droplet that comprises magnetic beads and moving this microfluidic droplet via the internal gap to the bead accumulation zone by use of electrowetting force;

accumulating the magnetic beads in the bead accumulation zone by use of a magnetic force provided by the bead manipulation magnet; and removing the bead manipulation magnet together with the magnetic beads from the gap via the bead extraction opening.

In a further embodiment the electrowetting force is provided by a plurality of electrodes, in particular by an electrode array, further in particular by a two-dimensional electrode array.

In a further embodiment the process of inserting the bead manipulation magnet comprises using a sleeve attached to the bead manipulation magnet and the process of removing the bead manipulation magnet comprises removing the bead manipulation magnet together with the sleeve.

In a further embodiment the process of inserting the bead manipulation magnet comprises inserting the bead manipulation magnet into an inner hollow space of the sleeve.

In a further embodiment the method comprises at least one bead washing process before and/or after removal of the magnetic beads from the gap.

In a further embodiment the method comprises a, in particular external, bead deposition process and/or a product release process after removal of the magnetic beads from the gap.

In a further embodiment the at least one bead wash cycle or external bead deposition process comprises withdrawing the bead manipulation magnet from an inner hollow space of the sleeve and reinserting the bead manipulation magnet into this hollow space.

In a further embodiment the method comprises at least one sample elution process prior to removing the magnetic beads from the gap.

In a further embodiment the method comprises simultaneously operating an array of sleeves and/or an array of bead manipulation magnets.

In a further embodiment of the method the magnetic beads are loaded with one or more products, in particular products of chemical and/or biochemical reactions, further in particular at least one amplified nucleic acid.

The invention further concerns a method for operating a cartridge or a sample processing system, the cartridge or a sample processing system comprising an internal gap with a bead transfer opening, a bead manipulation zone adjacent to the bead transfer opening and at least one hydrophobic surface for enabling an electrowetting induced movement of a microfluidic droplet. The method comprising:

- inserting a bead manipulation magnet with magnetic beads into the bead transfer opening;
- proving a microfluidic droplet in the bead manipulation zone;
- releasing the magnetic beads into the microfluidic droplet by weakening the magnetic force provided by the bead manipulation magnet; and
- moving this microfluidic droplet in the internal gap (6) by use of electrowetting force.

In a further embodiment of the method the process of inserting the bead manipulation magnet comprises using a sleeve that is attached to the bead manipulation magnet and/or the process of releasing the magnetic beads comprises removing the bead manipulation magnet without removing the sleeve.

In a further embodiment of the method the magnetic beads are loaded with sample molecules, in particular at least one of: nucleic acids, antibodies and antigens.

The features of the above-mentioned embodiments of the method can be used in any combination, unless they contradict each other.

BRIEF DESCRIPTION OF THE DRAWINGS

Embodiments of the current invention are described in more detail in the following with reference to the figures. These are for illustrative purposes only and are not to be construed as limiting. It shows FIG. 1 an overview over an exemplary digital microfluidics system that is equipped with a central control unit and a base unit, with four cartridge accommodation sites and with four board accommodation sites for receiving an electrode board that each comprises an electrode array.

DETAILED DESCRIPTION OF THE INVENTION

Figure 1:
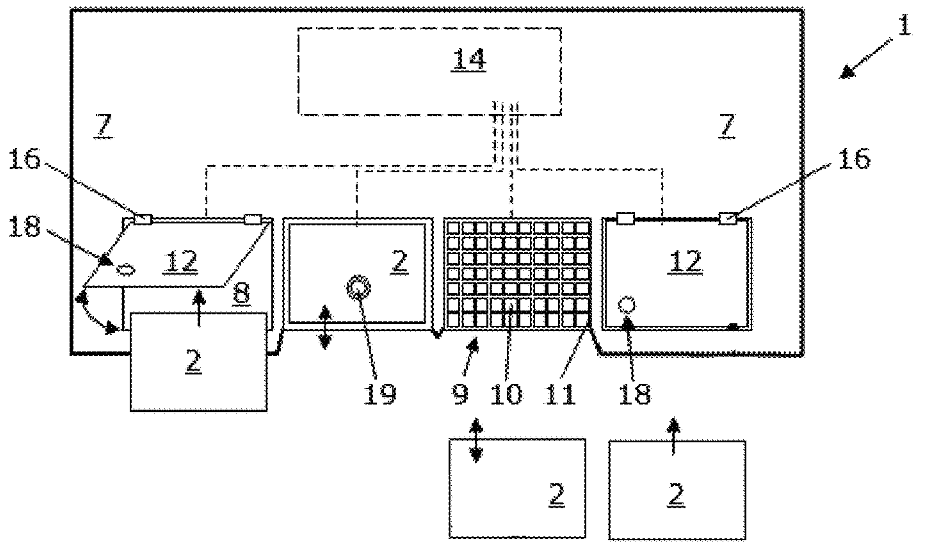

The FIG. 1 shows an overview over an electrowetting sample processing system exemplary shown as digital microfluidics system 1 that is equipped with a central control unit 14 and a base unit 7, with four cartridge accommodation sites 8 that each comprise an electrode array 9, and a cover plate 12. The digital microfluidics system 1 is configured for manipulating samples in microfluidic droplets 23, simply called microfluidic droplets 23, within cartridges designed as disposable cartridges 2. This digital microfluidics system 1 also comprises four board accommodation sites 40 for receiving an electrode board 41.

The droplets 23 can be a microfluidic droplet and/or a liquid comprising at least one of a reagent, a buffer, a diluent, an extraction liquid, a washing liquid and a suspension, which in particular is a suspension of magnetic beads, single cells or cell aggregates. Samples are for example DNA (Desoxyribonucleic acid), RNA (Ribonucleic Acid), derivatives thereof, proteins, cells, or other biologically or biochemically derived molecules or combinations thereof.

The digital microfluidics system 1 comprises a base unit 7 with at least one cartridge accommodation site 8 that is configured for taking up a disposable cartridge 2. The digital microfluidics system 1 can be a standalone and immobile unit, on which a number of operators are working with cartridges 2 that they bring along. The digital microfluidics system 1 thus may comprise a number of cartridge accommodation sites 8 and a number of electrode arrays 9 at least some of which are located on electrode boards 41.

It may be preferred to integrate the digital microfluidics system 1 into a liquid handling workstation or into a Freedom EVO® robotic workstation, so that a pipetting robot can be utilized to transfer liquid portions and/or sample containing liquids to and from the cartridges 2. Alternatively, the system 1 can be configured as a handheld unit which only comprises and is able to work with a low number, e.g. a single disposable cartridge 2. Every person of skill will understand that intermediate solutions that are situated in-between the two extremes just mentioned will also operate and work within the gist of the present invention.

According to the present invention, the digital microfluidics system 1 also comprises at least one board accommodation site 40 for taking up an electrode board 41 which comprises an electrode array 9 that substantially extends in a first plane and that comprises a number of electrodes 10. Such an electrode board 41 preferably is located at each one of said cartridge accommodation sites 8 of the base unit 7. Preferably each electrode array 9 is supported by a bottom substrate 11. It is noted that the expressions "electrode array", "electrode layout", and "printed circuit board (PCB)" are utilized herein as synonyms.

The digital microfluidics system 1 may also comprise at least one cover plate 12 with a top substrate; though providing of such cover plates 12 is particularly preferred, at least some of the cover plates may be dispensed with or may be replaced by an alternative cover for holding a disposable cartridge 2 in place inside the base unit of the microfluidics system 1. Thus, at least one cover plate 12 may be located at one of said cartridge accommodation sites 8. The cover plate 12 and the bottom substrate 11 with the electrode array 9 or PCB define a space or cartridge accommodation site 8 respectively. In a first variant (see the two cartridge accommodation sites 8 in the middle of the base unit 7, the cartridge accommodation sites 8 are configured for receiving a slidingly inserted disposable cartridge 2 that is movable in a direction substantially parallel with respect to the electrode array 9 of the respective cartridge accommodating site 8. Such front- or top-loading can be supported by a drawing-in automatism that, following a partial insertion of a disposable cartridge 2, transports the cartridge 2 to its final destination within the cartridge accommodation site 8, where the cartridge 2 is precisely seated. Preferably, these cartridge accommodation sites 8 do not comprise a movable cover plate 12. After carrying out all intended manipulations to the samples in microfluidic droplets, the used cartridges 2 can be ejected by the drawing-in automatism and transported to an analysis station or discarded.

In a second variant (see the two cartridge accommodation sites 8 on the right and left of the base unit 7), the cartridge accommodation sites 8 comprise a cover plate 12 that is configured to be movable with respect to the electrode array 9 of the respective cartridge accommodating site 8. The cover plate 12 preferably is configured to be movable about one or more hinges 16 and/or in a direction that is substantially normal to the electrode array 9.

Similar to the possibilities for inserting a disposable cartridge 2 into a cartridge accommodation site 8, possibilities for inserting the electrode board 41 into a board accommodation site 40 comprise the following alternatives:

(a) vertically lowering the electrode board 41 through the respective cartridge accommodation site 8 and into the board accommodation site 40;

(b) horizontally sliding the electrode board 41 below the respective cartridge accommodation site 8 and into the board accommodation site 40;

(c) horizontally sliding the electrode board 41 below the respective cartridge accommodation site 8 and substantially vertically lifting into the board accommodation site 40.

In FIG. 1, there is drawn only one electrode board 41 that slidingly can be inserted by front loading below the second cartridge accommodation site 8 (as counted from the left). All possible places for locating a board accommodation site are indicated and pointed to by dashed arrows.

The digital microfluidics system 1 also comprises a central control unit 14 for controlling the selection of the individual electrodes 10 of said at least one electrode array 9 and for providing these electrodes 10 with individual voltage pulses for manipulating microfluidic droplets within said cartridges 2 by electrowetting. As partly indicated in FIG. 1, every electrode 10 is operatively connected to the central control unit 14 and therefore can be independently or commonly addressed by this central control unit 14, which also comprises the appropriate sources for creating and providing the necessary electrical potentials in a way known in the art.

The at least one cover plate 12 preferably comprises an electrically conductive material that extends in a second plane and substantially parallel to the electrode array 9 of the cartridge accommodation site 8 the at least one cover plate 12 is assigned to. It is particularly preferred that this electrically conductive material of the cover plate 12 is configured to be not connected to a source of an electrical ground potential. The cover plate 12 can be configured to be movable in any arbitrary direction and no electrical contacts have to be taken in into consideration when selecting a particularly preferred movement of the cover plate 12. Thus, the cover plate 12 may be configured to be also movable in a direction substantially parallel to the electrode array 9 and for carrying out a linear, circular or any arbitrary movement with respect to the respective electrode array 9 of the base unit 7.

Figure 2:
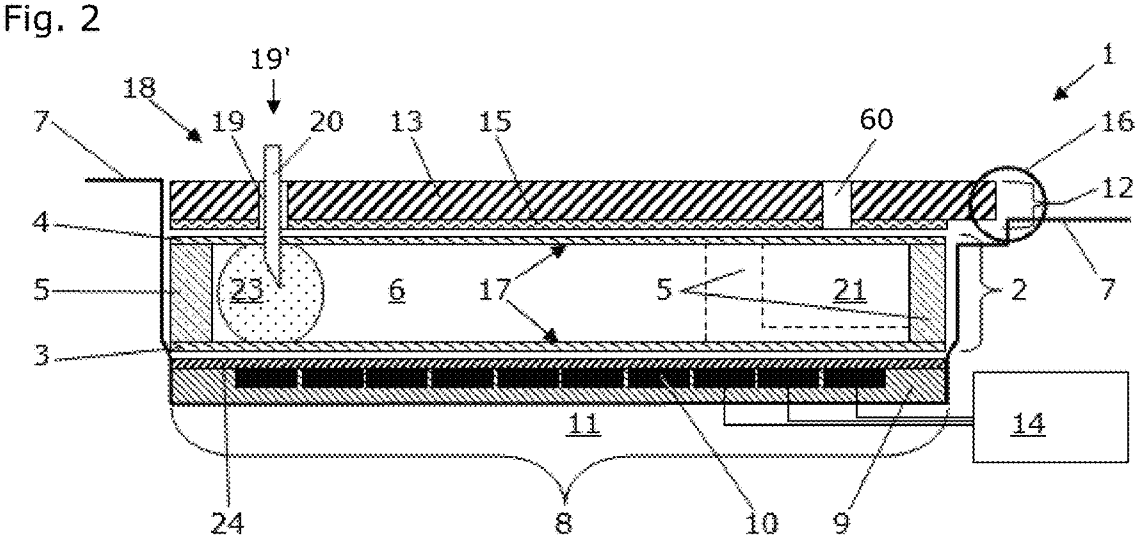
FIG. 2 a section view of one cartridge accommodation site with a disposable cartridge according to FIG. 1 therein; the electrode array being located on a fixed bottom substrate.

The FIG. 2 shows a section view of one exemplary cartridge accommodation site 8 with the disposable cartridge 2 according to FIG. 1 accommodated therein. The disposable cartridge 2 comprises a bottom layer 3 as a second part of the cartridge 2, a top layer 4 as a first part of the cartridge 2, and a spacer 5 that defines a gap 6 between the bottom and top layers 3,4 for manipulating samples in microfluidic droplets 23 in this gap 6.

The cover plate 12 is mechanically connected with the base unit 7 of the digital microfluidics system 1 via a hinge 16; thus, the cover plate 12 can swing open and a disposable cartridge 2 can be placed on the cartridge accommodation site 8 via top-entry loading (see FIG. 1). An electrically conductive material 15 of the cover plate 12 is configured as a thin metal plate or metal foil that is attached to the top substrate 13. Alternatively, the electrically conductive material 15 of the cover plate 12 is configured as a metal layer that is deposited onto the top substrate 13. Such deposition of the conductive material 15 may be carried out by chemical or physical vapor deposition techniques as they are known per se.

The cover plate 12 is configured to apply a force to a disposable cartridge 2 that is accommodated at the cartridge accommodation site 8 of the base unit 7. This force urges the disposable cartridge 2 against the electrode array 9 in order to position the bottom layer 3 of the cartridge as close as possible to the surface of the electrode array 9. This force also urges the disposable cartridge 2 into the perfect position on the electrode array 9 with respect to a piercing facility 18 of the cover plate 12. This piercing facility 18 is configured for introducing sample droplets into the gap 6 of the cartridge 2. The piercing facility 18 is configured as a through hole 19 that leads across the entire cover plate 12 and that enables a piercing pipette tip 20 to be pushed through and pierce the top layer 4 of the cartridge 2. The piercing pipette tip 20 may be a part of a handheld pipette (not shown) or of a pipetting robot (not shown).

In the case shown in FIG. 2, the electrode array 9 is covered by a dielectric layer 24. The electrode array 9 is fixed to a bottom substrate 11 and every individual electrode 10 is electrically and operationally connected with the central control unit 14 (only three connections of the ten electrodes 10 are drawn here). The electrode array 9 is located on an immovably fixed bottom substrate 11. The digital microfluidics system 1 is configured for manipulating samples in microfluidic droplets 23 within disposable cartridges 2 that contain a gap 6. Accordingly, the samples in microfluidic droplets 23 are manipulated in the gap 6 of the disposable cartridge 2. The disposable cartridge 2 comprises the bottom layer 3, the top layer 4, and the spacer 5 that defines the gap 6 between the bottom and top layers 3,4 for manipulating samples in microfluidic droplets 23 in this gap 6. The bottom layer 3 and the top layer 4 comprise a hydrophobic surface 17 that is exposed to the gap 6 of the cartridge 2. The bottom layer 3 and the top layer 4 of the cartridge 2 are entirely hydrophobic films or at least comprise a hydrophobic surface that is exposed to the gap 6 of the cartridge 2. The spacer 5 of the cartridge 2 may optionally be configured as a body that includes compartments 21 for reagents needed in an assay that is applied to the sample droplets in the gap 6 (dotted lines).

In one example, the bottom substrate 11 or the PCB that contains the electrode array 9 or the electrodes 10 has an electrical connector, which connects to a relay PCB, which is connected to a control PCB, wherein the control PCB is part of the central control unit 14.

Figure 3:
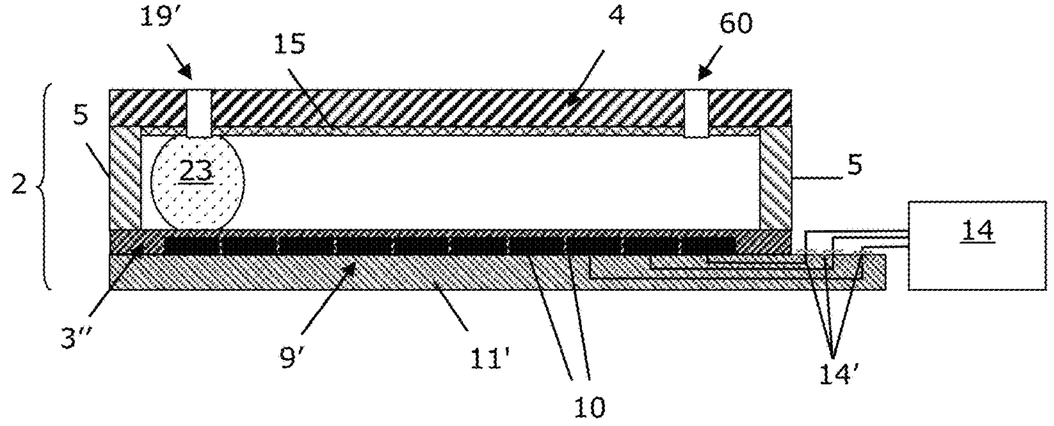
FIG. 3 a section view of a further exemplary cartridge accommodation site according to FIG. 2, wherein the electrode array is a part of the cartridge.

FIG. 3 shows a section view of a further exemplary cartridge accommodation site according to FIG. 2 with a cartridge 2, wherein—in contrast to FIG. 2—the cartridge 2 comprises an electrode array 9' of individual electrodes 10.

Further the cartridge 2 comprises an upper part 4, a spacer 5, a hydrophobic layer 3", a support element 11' for the electrode array 9', an optional through hole 19, a liquid input port 19' and electrically conductive material. The upper part 4 and the spacer 5 may be provided as separate parts or in form of a single piece. The hydrophobic layer 3", the electrode array 9' and the support element 11' form the lower part of the cartridge. The electrode array 9' is arranged between the hydrophobic layer 3" and the support element 11' and the gap is formed between the upper part 4 and the hydrophobic layer 3". Further, the hydrophobic layer 3" is attached to a peripheral side structure of the upper part 4 resp. to the spacer 5. The support element 11' further comprises electrical connectors 14', which are connected via multiple electrical wires to the electrode array 9'. In turn, the electrical connectors 14' provide for a connection to a central control unit 14 such that the electrical connectors 14' implement an electrical interface between cartridge 2 and the digital microfluidics system 1. The electrical interface can also be implemented by a contact field, i.e. a plurality of electrically conductive, mutually insulated contact areas.

Figure 4:
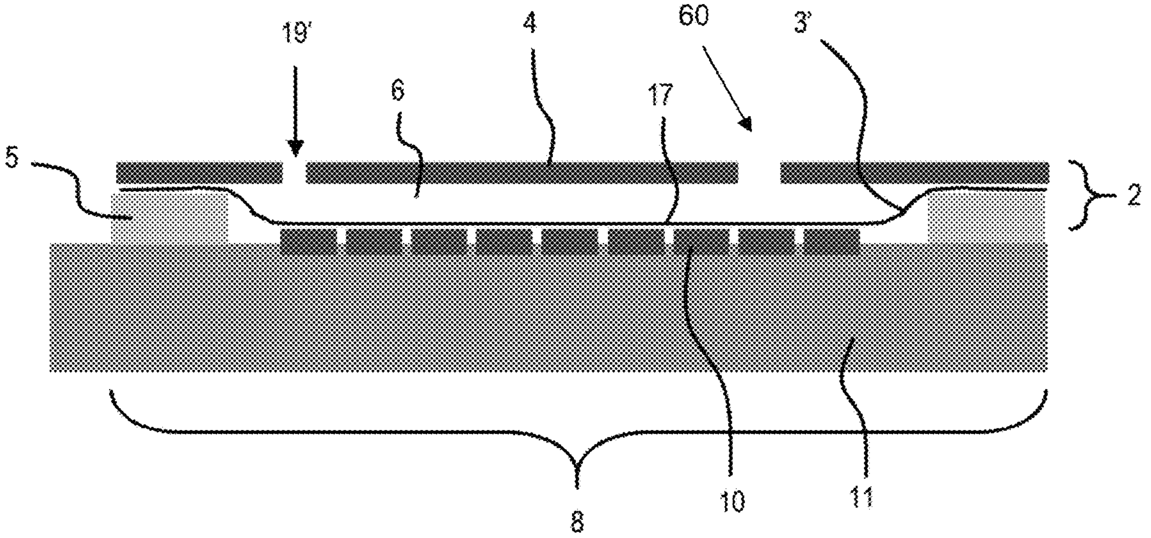
FIG. 4 a section view of a cartridge accommodation site with a disposable cartridge according to an embodiment of the invention, the cartridge comprising bead accumulation zone (50) and a bead extraction opening (60)

FIG. 4 shows section view of one cartridge accommodation site 8 with a disposable cartridge 2 according to a further embodiment accommodated therein. Again, the electrodes 10 are arranged on and fixed to the bottom substrate 11. Again, the disposable cartridge 2 comprises a bottom layer 3' and a top layer 4. Attached to the disposable cartridge is a spacer 5 that defines a gap 6 between the bottom and top layer 3, 4 for manipulating samples in microfluidic droplets 23 in this gap 6. In this embodiment, the bottom layer is a flexible bottom layer, for example a membrane 3', for example with a hydrophobic surface 17. For example, the membrane 3' is a 8 to 50 μm thick polypropylene film.

An inlet port 19' for introducing liquid into the gap 6 is provided in the top layer 4 of the cartridge 2.

Preferably, the flexible bottom layer 3 is reversibly attached to the electrodes 10 in an electrowetting sample processing system 1. The spacer 5 may be a part of the cartridge 2 or a part of the electrowetting sample processing system 1. In one example, the spacer 5 comprises stainless steel, aluminum, hard plastic, in particular COP or ceramic. The spacer 5 may be designed to define the height of the gap 6. The spacer 5 may additionally serve as a gasket for sealing the gap 6.

Figure 5:
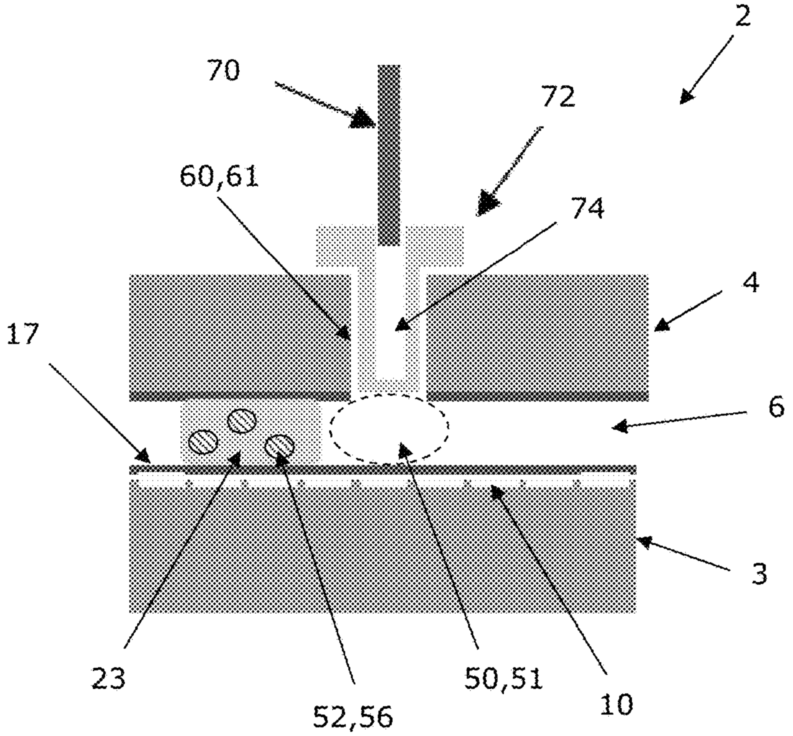
FIG. 5 a schematic, more detailed view of the comprising bead accumulation zone (50) and a bead extraction opening (60) according to FIG. 3.

FIG. 5 shows a schematic view of the bead extraction region of the cartridge 2 according to the invention. In this example, the cartridge 2 is a disposable cartridge, which comprises the top layer 4, the bottom layer 3, the internal gap 6, a hydrophobic surface 17, a bead accumulation zone 50 within the gap 6 and a bead extraction opening 60 adjacent to the bead accumulation zone 52. The cartridge 2 is placed on the electrowetting sample processing system and on top of electrodes 10 as shown in FIG. 4.

The bead extraction opening 60 is located on a side of the gap 6 opposite to the hydrophobic surface 17, namely at the top layer 4, and configured to removably receive a bead manipulation magnet. The bead extraction opening 60 may be identical with a through hole 19 or with an inlet port 19'. In this example, a bead manipulation magnet 70 together with a sleeve 72 is inserted into the bead extraction opening 60. Furthermore, the bead manipulation magnet 70 is removably inserted into an interior hollow space of the sleeve 72 such that the sleeve 72 covers an operating end of the bead manipulation magnet 70, in this example the lower end of the bead manipulation magnet 70.

In the depicted situation, a microfluidic droplet 23 is present in the internal gap of the cartridge 2. The microfluidic droplet 23 is movable into the bead accumulation zone 50 by activating and deactivating the corresponding electrodes 10 of the electrowetting sample processing system. This way, the hydrophobic surface 17 and the field of the electrodes 10 enable an electrowetting induced movement of a microfluidic droplet 23 that comprises magnetic beads 52. In this example, the electrowetting force is provided by a plurality of electrodes 10, which form an electrode array a two-dimensional electrode array. Other electrode configurations, for example one-dimensional arrays, are also possible.

The microfluidic droplet 23 comprises a processing liquid, typically a reagent liquid, and the magnetic beads 52. Other liquids are also possible such as a buffer, a diluent, an extraction liquid, a washing liquid and a suspension, which further in particular may comprise a suspension of single cells and/or cell aggregates. In addition, the microfluidic droplet 23 may also comprise or be embedded in an electrowetting filler liquid such as a silicone oil.

Conventionally, electrowetting based cartridges and systems are used to perform analytical processes. Samples to be analyzed, reagents and diluents are introduced in a cassette filled with an electrowetting filler liquid. The analytical processes are performed by using electrowetting forces for moving, mixing or diluting droplets within the cassette. The assay result may be indicated by change or intensity of color or alternatively by arising or change of intensity of fluorescence. It can be measured by light absorbance or fluorescence measurement. After the read-out, the cassette is discarded with its content or the content is sucked out of the cassette by applying vacuum and the emptied cassette is discarded and the content is disposed.

In contradiction to analysis, the products of chemical or biochemical reactions may be used for further downstream processes. Products may be amplified nucleic acids, antibody-antigen complexes or other protein complexes. Downstream processes may be gene sequencing or protein characterization.

Figure 6:
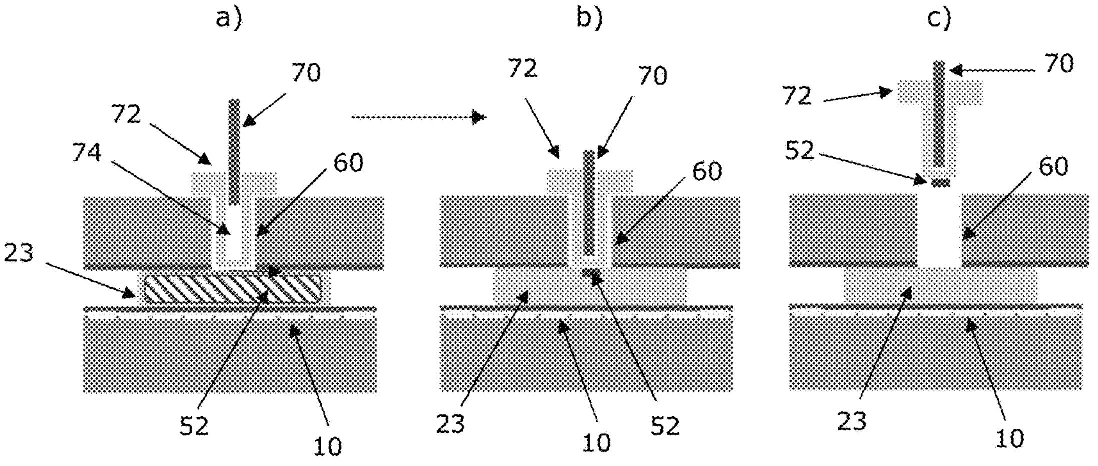
FIG. 6 a schematic view of several steps of the method of operating the cartridge or the sample processing system according to the invention.

FIG. 6 shows a schematic view of several steps of the method of operating the cartridge or the sample processing system according to the invention for removing magnetic beads 52 from a microfluidic droplet 23. The FIG. subdivisions illustrate the following steps:

a) Inserting the bead manipulation magnet 70 into the bead extraction opening 60 together with the sleeve 72, wherein the bead manipulation magnet 70 has not yet been fully inserted into the hollow space of the sleeve 72.

In addition, applying an electrowetting force for moving the microfluidic droplet 23 that comprises the magnetic beads 52 from a position as shown in FIG. 5 via the internal gap 6 into the bead accumulation zone 50.

In a further example, the sample processing system performs a preliminary magnetic bead processing, in which the bead manipulation magnet 70 is removed from the sleeve 72. Such a situation allows for manipulations of the beads 52 without attraction towards the bead manipulation magnet 70.

b) Completely inserting the bead manipulation magnet 70 into the hollow space of the sleeve 72 such that the magnetic beads 52 in the bead accumulation zone 50 are exposed to the magnetic force provided by the bead manipulation magnet 70, which results in accumulation of the magnetic beads 52 in the bead accumulation zone 50.

c) After completing the bead accumulation, removing the bead manipulation magnet 70 together with the sleeve 72 and the magnetic beads 52 via the bead extraction opening 60.

Other sequences of process steps are also possible, for example the inserting of the bead manipulation magnet 70 with a sleeve 72 into the bead extraction opening 60, such that the bead manipulation magnet 70 is completely inserted into the hollow space of the sleeve 72.

The bead manipulation magnet 70 together with the sleeve 72 and the magnetic beads 52 may be transferred to an exterior space of the electrowetting sample processing system and/or to a neighboring system, for example to a well of a microplate.

Figure 7:
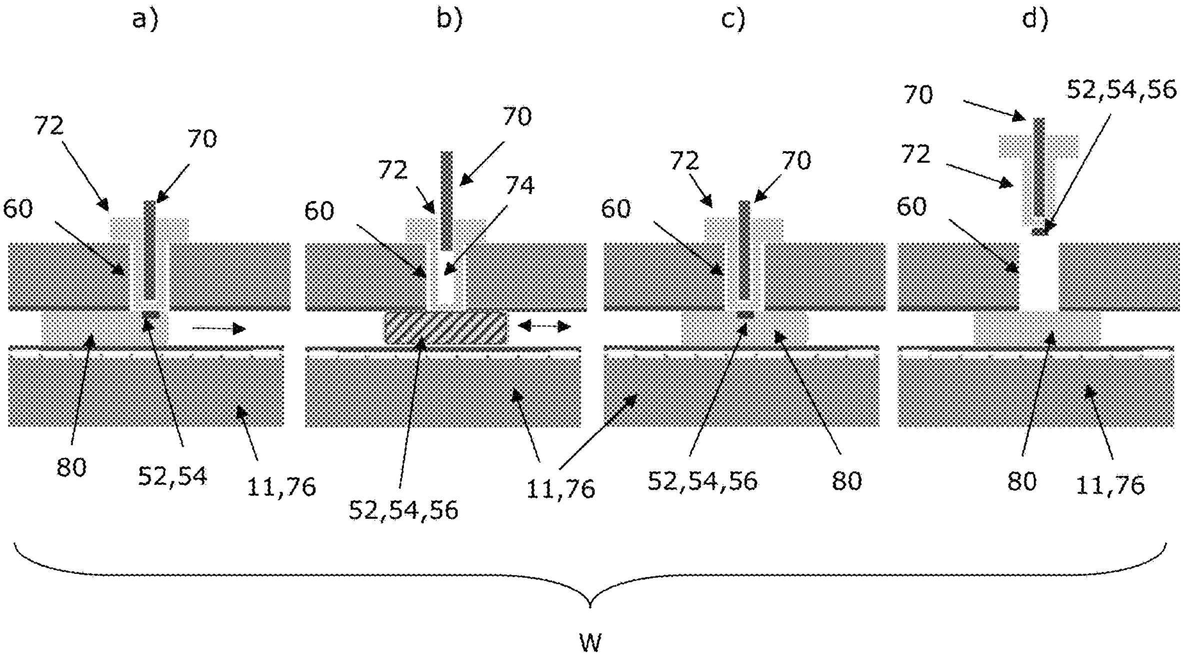
FIG. 7 a schematic view of a washing process subsequent to the method according to FIG. 5.

FIG. 7 shows a schematic view of the method according to FIG. 5 and FIG. 6 with a bead washing process W:

a) the magnetic beads 52 are accumulated according to FIG. 6, step b), wherein a droplet that comprises a wash buffer 80 is moved by electrowetting manipulation to the bead extraction opening 60 (indicated by arrow);

b) releasing the magnetic beads 52 by removing the bead manipulation magnet 70 without removing the sleeve 72 from the bead extraction opening 60, i.e. withdrawing the bead manipulation magnet 70 from an inner hollow space 74 of the sleeve 72 and reinserting the bead manipulation magnet 70 into this hollow space, wherein the droplet with wash buffer 80 is wiggled back and forth suspending and washing the magnetic beads 52;

c) accumulating the magnetic beads 52 according to FIG. 7, step a); and d) removing the bead manipulation magnet 70 together with the sleeve 72 and the magnetic beads 52 according to FIG. 6, step c).

Steps b) and c) may be repeated several times using a new droplet of wash buffer 80 each time.

The bead wash process may be performed internally, i.e. with the gap 6 used for electrowetting, and/or externally to the cartridge 2 or external to the gap 6, for example in one or more wells of a microplate. The beads are removed from the cartridge as shown in FIG. 6, step c), then moved to a tube 76 in FIG. 7, step a), released in FIG. 7, step b) for washing, then recollected in FIG. 7, step c) and removed from the wash buffer 80 in FIG. 7, step d). The FIG. 7 process may be repeated until the beads 52 are purified.

Alternatively, the bead manipulation magnet 70 together with the sleeve 72 and the magnetic beads 52 are transferred to one or more wells of a microplate for washing: the magnetic beads 52 are transferred after step c) of FIG. 6 into a well of a microplate. The magnetic beads 52 are suspended in a wash buffer that is contained within the wells of the microplate and subsequently accumulated again.

In a further example, the processing as shown enables for bead washing, wherein the beads 52 comprise a DNA 54, which remains on the beads 52 during the washing process as well as during the removal of the beads 52.

The process of bead washing requires that the bead manipulation magnet 70 gets removed from the sleeve 72 so that the beads 52 get dispersed into wash buffer 80. The sleeve 72 is made of a polymer material, in particular of plastic material. Depending on the wash process, the beads 52 might go through several rounds of this process.

Figure 8:
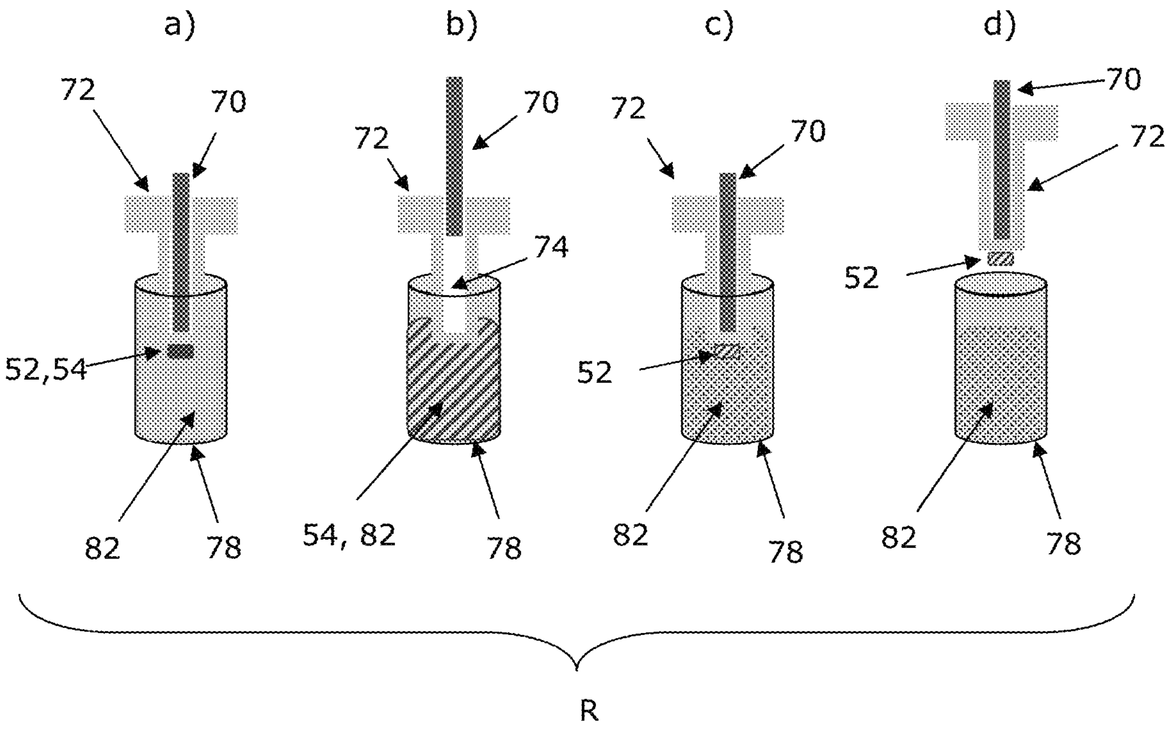
FIG. 8 a schematic view of a product releasing process subsequent to the method according to FIG. 5 or 6.

To change the wash buffer 80 to another buffer for some other process (i.e. DNA release as shown in FIG. 8), the beads 52 are collected again by inserting the bead manipulation magnet 70, removed from the tube 76 and then the assembly is moved to the other process, for example transferred to one or more wells of a microplate for further processing, in particular for a bead washing process and/or a product release process.

Furthermore, FIG. 6 and FIG. 7 illustrate a method for operating a cartridge or a sample processing system for inserting beads that are loaded with sample molecules 56, in particular at least one of: nucleic acids, antibodies and antigens. The cartridge or a sample processing system comprises an internal gap 6 with a bead transfer opening 61, a bead manipulation zone 51, adjacent to the bead transfer opening and at least one hydrophobic surface 17 for enabling an electrowetting induced movement of a microfluidic droplet 23. The method comprises the steps:

- inserting a bead manipulation magnet 70 into the bead transfer opening 61 together with the sleeve 72, which is removably attached to the bead manipulation magnet 70 and with the magnetic beads 52, which are removably attached to the sleeve 72;
- providing a microfluidic droplet 23 in the bead manipulation zone 51;
- releasing the magnetic beads 52 into the microfluidic droplet 23 by weakening the magnetic force provided by the bead manipulation magnet 70; and
- moving this microfluidic droplet 23 with the sample molecules 56 in the internal gap 6 by use of electrowetting force.

The tube 76 or the well 78 of a microplate can also be a cartridge as shown in FIG. 6, i.e. a cartridge 2 with electrodes 10 used for electrowetting. In another example, the tube 76 or the well 78 of a microplate may be a cartridge without electrowetting electrodes.

FIG. 8 shows an additional optional release process R, in which a product such as a DNA 54 is released from the beads 52 by using a similar process as shown in FIG. 7. In this example, the tube is a well 78 of a microplate (not shown), in another example, the tube is an external or internal tube as shown in FIG. 7. The well 78 of the microplate contains a release buffer 82, which is able to release the DNA 54 from the surface of the magnetic beads 52. The figure subdivisions illustrate the following steps:

a) transferring the magnetic beads 52 into the release buffer 82 by inserting the bead manipulation magnet 70 with the sleeve 72 and the magnetic beads 52 into the well 78 of the microplate;

b) withdrawing the bead manipulation magnet 70 from the inner hollow space 74 of the sleeve 72 without moving the sleeve 72 from its position, thereby suspending the magnetic beads and releasing the product from the surface of the beads;

c) reinserting the bead manipulation magnet 70 into the hollow space 74 of the sleeve 72, thereby re-capturing the magnetic beads 52 having substantially no DNA 54 adherent (indicated by hatches), wherein the DNA 54 is solved in the release buffer (indicated by dotted area); and d) removing the bead manipulation magnet 70 together with the sleeve 72 and attached magnetic beads 52 from the release buffer 82.

In step b) the magnetic force acting on the magnetic beads 52 decreases, because of the increased magnetic distance. This accomplishes a dispense of the magnetic beads 52 into the liquid of the external system and thus a bead deposition process in the well 78 of the microplate.

The release process is exemplary shown for DNA, but other products can be processed in correspondingly, in particular products of chemical and/or biochemical reactions, further in particular amplified nucleic acids.

Preferred dimensions and materials are pointed to in table 1. These indications of materials and dimensions serve as preferred examples without limiting the scope of the present invention.

TABLE 1

| Part | No | Material | Dimensions and Shape |
|---|---|---|---|
| Droplet | 23 | aqueous | Volume: 0.1-5 µl |
| Substrate | 11 | PCB; Synth. Polymer | — |
| Electrodes | 10 | Al; Cu; Au; Pt | Plating: 1.5 × 1.5 mm |
| Electrode Array | 9 9' | Electrodes | 1 or 2 dimensional |
| Film | 3 | Fluorinated ethylene propylene (FEP), Cyclo olefin polymer (COP), Polypropylene (PP) | thickness: 8-50 µm |
| Hydrophobic surface | 17 | Teflon ® (PTFE), COP, FEP, PP, Cytop | thickness: 8-50 µm Coating: 2-200 nm Spin coating: 5-500 nm, preferably 20 nm |
| Rigid cover | 4 | Mylar ®; acrylic; Polypropylene (PP) | 65 × 85 mm; Plate: 0.5-25.0 mm, preferably 1.5 mm |
| Gap | 6 | — | 0.2-2.0 mm, preferably 0.5 mm |
| Pipetting orifice | 19 | — | Diameter: 0.3-3.0 mm |
| Spacer, Gasket | 5 | Polypropylene (PP), Synthetic or natural rubber | Frame: 0.2-2.0 mm, preferably 0.5 mm |
| Electrowetting filler liquid | 60 | Silicon oil | Volume: 1-5 ml |

REFERENCE SIGNS LIST

1 electrowetting sample processing system
2 disposable cartridge
3 bottom layer
3' membrane
3" hydrophobic layer
4 top layer
5 spacer
6 gap between 3 and 4
7 base unit
8 cartridge accommodation site
9,9' electrode array
10 electrode
11 bottom substrate
11' support element
12 cover plate
13 top substrate
14 central control unit
15 electrically conductive material
16 hinge
17 hydrophobic surface
18 piercing facility
19 through hole
19' inlet port
20 piercing pipette tip
21 compartment
23 microfluidic droplet
23' microfluidic droplet with beads removed
24 dielectric layer
26 disposable pipette tip
50 bead accumulation zone
51 bead manipulation zone
52 magnetic beads
54 DNA
56 sample molecules
60 bead extraction opening
61 bead transfer opening
70 bead manipulation magnet
72 sleeve
74 hollow space
76,78 tube, well of microplate
80 wash liquid, wash buffer
82 release buffer
W bead washing process
R product release process

What is claimed is:

1. A disposable cartridge for use in an electrowetting sample processing system, the cartridge comprising an internal gap with at least one hydrophobic surface for enabling an electrowetting induced movement of a microfluidic droplet that comprises magnetic beads and further comprising a bead accumulation zone, into which the microfluidic droplet is transferable by electrowetting force and in which the magnetic beads are exposable to a magnetic force of a bead manipulation magnet, wherein the internal gap comprises a bead extraction opening adjacent to the bead accumulation zone, wherein the bead extraction opening provides a passage from the gap to an exterior space of the cartridge and is configured to removably receive the bead manipulation magnet for enabling an extraction of the magnetic beads from the microfluidic droplet by a removal of the bead manipulation magnet.

2. The cartridge according to claim 1, comprising a first part with the bead extraction opening and a second part attached to the first part, such that the gap is formed between the first part and the second part.

3. The cartridge according to claim 2, wherein the first part comprises a rigid body and/or the second part comprises or is an electrode support element or a flexible film, wherein the flexible film is a polymer film and/or an electrically isolating film, wherein the flexible film is attached to a peripheral side structure of the first part.

4. The cartridge according to claim 2, wherein the gap is defined by a spacer that is arranged between the first part and the second part and/or by the shape of at least one of the two parts of the cartridge.

5. The cartridge according to claim 1, wherein the bead extraction opening is located on a side of the gap opposite to the hydrophobic surface and/or on a peripheral side of the gap.

6. The cartridge according to claim 1, wherein the bead extraction opening is configured to receive a removable sleeve together with the bead manipulation magnet, which is removably insertable into an interior space of the sleeve.

7. The cartridge according to claim 1, comprising at least one electrode for applying an electrowetting force to the microfluidic droplet (23).

8. The cartridge according to claim 1, comprising at least one processing zone, from which the microfluidic droplet is movable to the bead accumulation zone.

9. The cartridge according to claim 1, wherein the microfluidic droplet comprises a processing liquid comprising at least one of: a reagent liquid, a buffer, a diluent, an extraction liquid, a washing liquid and a suspension, which further comprises a suspension single cells and/or cell aggregates.

10. The cartridge according to claim 1, wherein the magnetic beads are loaded with one or more products.

11. An electrowetting sample processing system, comprising a cartridge according to claim 1.

12. An electrowetting sample processing system comprising an internal gap with at least one hydrophobic surface for enabling an electrowetting induced movement of a microfluidic droplet that comprises magnetic beads and further comprising a bead manipulation magnet and a bead accumulation zone, into which the microfluidic droplet is transferable by electrowetting force and in which the magnetic beads are controllable by a magnetic force of the bead manipulation magnet, wherein the internal gap comprises a bead extraction opening adjacent to the bead accumulation zone, wherein the bead extraction opening provides a passage from an interior space of the gap to an exterior space of the gap and is configured to removably receive the bead manipulation magnet for enabling an extraction of the magnetic beads from the microfluidic droplet by a removal of the bead manipulation magnet.

13. The electrowetting sample processing system according to claim 11, wherein the bead extraction opening is configured to receive the bead manipulation magnet together with a removable sleeve which covers an operating end of the bead manipulation magnet.

14. The electrowetting sample processing system according to claim 13, wherein the bead manipulation magnet is configured to be insertable into a hollow inner space of the sleeve.

15. The electrowetting sample processing system according to claim 11, comprising a two-dimensional array of bead manipulation magnets and/or a two-dimensional array of sleeves.

16. The electrowetting sample processing system according to claim 11, comprising at least one electrode for applying an electrowetting force to the microfluidic droplet.

17. The electrowetting sample processing system according to claim 16, comprising a transfer space for transporting beads from the bead extraction opening to an exterior space of the electrowetting sample processing system.

18. The cartridge according to claim 4, wherein the gap is defined by the shape of at least one of the two parts of the cartridge and by a flexible part or a rigid part of the cartridge.

19. The cartridge according to claim 7, wherein the at least one electrode comprises an electrode array.

20. The cartridge according to claim 10, wherein the one or more products are products of chemical and/or biochemical reactions.

21. The cartridge according to claim 10, wherein the one or more products comprise at least one amplified nucleic acid.

22. A biological sample processing system, comprising a cartridge according to claim 1.

* * * * *